United States Patent
Braun

(10) Patent No.: US 7,196,735 B2
(45) Date of Patent: Mar. 27, 2007

(54) METHOD FOR DETERMINING AN ADJUSTMENT AMOUNT TO AN INPUT CHROMA

(75) Inventor: Karen M Braun, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 514 days.

(21) Appl. No.: 10/642,796

(22) Filed: Aug. 18, 2003

(65) Prior Publication Data

US 2005/0041155 A1    Feb. 24, 2005

(51) Int. Cl.
*H04N 9/64* (2006.01)

(52) U.S. Cl. ............... 348/649; 348/603; 348/650; 348/708

(58) Field of Classification Search ........ 348/649–650, 348/603, 621, 624, 645, 655, 708, 712–713, 348/256; 382/162, 167–168; 358/518, 520, 358/500–501, 522–523

See application file for complete search history.

(56) References Cited

U.S. PATENT DOCUMENTS

| | | | | |
|---|---|---|---|---|
| 5,930,009 | A | * | 7/1999 | Sato et al. ................ 358/518 |
| 6,058,207 | A | | 5/2000 | Tuijn et al. ............... 382/162 |
| 6,438,264 | B1 | * | 8/2002 | Gallagher et al. ........ 382/167 |
| 6,947,078 | B1 | * | 9/2005 | Kuwata et al. ........... 348/223.1 |
| 2002/0191084 | A1 | * | 12/2002 | Kurokawa ................ 348/222.1 |
| 2004/0151370 | A1 | | 8/2004 | Sasaki |
| 2005/0041853 | A1 | | 2/2005 | Braun |
| 2005/0041857 | A1 | | 2/2005 | Braun |

OTHER PUBLICATIONS

U.S. Appl. No. 09/562,198, filed May 2, 2000, entitled "Color Rendering Optimized for Text and Line", by Raja Bala et al.
U.S. Appl. No. 09/731,338, filed Dec. 6, 2000, entitled "Graphical User Interface for Color Transformation Table Editing That Avoids Reversal Artifacts", Martion S. Maltz et al.
Article by Karin Töpfer and Robert Cookingham of the Eastmak Kodak Company in Rochester, NY, entitled: "The Quantitative Aspects of Color Rendering for Emmory Colors" from the IS&T's 2000 PICS Conference.

* cited by examiner

*Primary Examiner*—David Ometz
*Assistant Examiner*—Trang U. Tran

(57) ABSTRACT

A method is disclosed for determining an adjustment amount to be made to an input chroma, $C_{in}$, to squeeze the input chroma toward a region of preferred chroma, $C_{pref}$. This method involving first defining a change in chroma as: $\Delta C = C_{in} - C_{pref}$ and defining a chroma weight as: $C_{weight} = \text{Gaussian}(C_{pref}, C_{sigma})$; defining a luminance weight as: $L_{weight} = \text{Gaussian}(L_{pref}, L_{sigma})$; defining a hue weight as: $H_{weight} = \text{Gaussian}(H_{pref}, H_{sigma})$;. Then, an amount of chroma adjustment is: $C_{Adjust} = \Delta C * (H_{weight} * C_{weight} * L_{weight})$. An output chroma is generated by applying chroma adjustment to chroma input: $C_{out} = C_{in} - C_{Adjust}$.

19 Claims, No Drawings

METHOD FOR DETERMINING AN ADJUSTMENT AMOUNT TO AN INPUT CHROMA

RELATED APPLICATIONS

Cross reference is made to the following applications filed concurrently herewith: Ser. No. 10/642,794 entitled "A METHOD FOR DETERMINING A HUE ADJUSTMENT TO AN INPUT HUE" by Karen M. Braun; and Ser. No. 10/642,795 entitled "A METHOD FOR SQUEEZING AN INPUT HUE TOWARD A REGION OF PREFERRED HUE" by Karen M. Braun.

FIELD OF THE INVENTION

The present invention generally relates to methods for converting color values and, more particularly, to methods for adjusting input colors in the direction of a specified output color to improve image appearance.

BACKGROUND OF THE INVENTION

Film companies are known to change certain colors to, for instance, show skin more tanned or the sky a different shade of blue. This is relatively easy when one has control over most every aspect of the image capturing and image production process. However, when the input image has been captured and rendered in an unknown way, improving certain colors therein becomes more complicated. This often involves segmenting colors believed to make up a certain color then adjusting these toward a preferred color point. This is computationally intensive, subject to failure, and often results in non-smooth transitions between different color regions such as skin color and non-skin color areas.

Another approach is to specify both original and desired color and then apply a vector from original to desired color with the effect of the vector smoothly decaying for nearby colors in color space. One problem with this approach is non-monotonic behavior leading to color reversals. Other techniques involve a weighting function for transforming a color to a new color and smoothly adjusting surrounding colors without inducing any tone reversals using a Gaussian weight on the difference between the input and the desired output. This method also uses a conditional function to insure monotonicity of the input to output relationship. Another technique transforms an input color to a desired output color and colors surrounding the input color are appropriately warped to give smooth and monotonic output using a concept of color gravity wells toward which other colors are adjusted. However, this technique is specific to neutrals and pure primaries and secondaries.

What is needed in this art is a method for adjusting input colors in the direction of a specified output color to improve image appearance that acts on colors in color space rather than adjusting the colors of certain pixels spatially to robustly render critical colors which are known a priori.

BRIEF SUMMARY

A method is disclosed for determining an adjustment amount to be made to an input chroma, $C_{in}$, to squeeze the input chroma toward a region of preferred chroma, $C_{pref}$. This method involving first defining a change in chroma as: $\Delta C = C_{in} - C_{pref}$ and defining a chroma weight such that the weight approaches 1 at the peak of the Gaussian as: $C_{weight} = \text{Gaussian}(C_{pref}, C_{sigma})$. Then, an amount of chroma adjustment is then: $C_{Adjust} = \Delta C * C_{weight}$. An output chroma is generated by applying chroma adjustment to chroma input: $C_{out} = C_{in} - C_{Adjust}$. Similarly, disclosed is method for determining an adjustment amount to be made to an input lightness.

The present invention offers a plurality of advantages. For example, the input can also be squeezed toward a point in either RGB, a*b*, or u'v' space. Multiple hue centers can be use to sequentially squeeze the input toward a region of a preferred skin, sky, or grass. In the case of multiple squeezes, finite non-overlapping regions of support maintain the shifts from previous squeezes. The inputs can be pre-specified in a color management system or specified and provided dynamically. When squeezing is applied in a non-uniform way, a left side of a weighting curve and a right side of another are used to find regions of rapid decrease in quality for positive $\Delta H^*_{ab}$ renditions of certain tones.

DESCRIPTION OF THE SPECIFICATION

One method is disclosed for determining a hue adjustment to an input hue, $H_{in}$, to squeeze the input hue toward a region of preferred hue, $H_{pref}$. The method involves obtaining a change in hue as: $\Delta H = H_{in} - H_{pref}$ and a hue weight such that the weight approaches 1 at the peak of the Gaussian as: $H_{weight} = \text{Gaussian}(H_{pref}, H_{sigma})$. An amount of hue adjustment is calculated by: $H_{Adjust} = \Delta H * H_{weight}$. Then, an output hue is generated by applying the adjustment such that: $H_{out} = H_{in} - H_{Adjust}$.

Change in hue, $\Delta H$, is the difference between the input hue, $H_{in}$ is the hue of a given pixel in the image (or node in the table) and the preferred hue, $H_{pref}$.

$\Delta H = H_{in} - H_{pref}$ $H_{weight} = \text{Gaussian}(H_{pref}, H_{sigma})$ $H_{Adjust} = \Delta H * H_{weight}$ $H_{out} = H_{in} - H_{Adjust}$ The weight approaches 1 at the peak of the Gaussian. When $H_{in}$ is close to the preferred hue, $H_{pref}$, the $\Delta H$ causes the hue adjustment ($H_{Adjust}$) to be small so the output hue is very similar to the input hue (not rotated completely to the preferred hue). Hues very close to, or very far from, the preferred hue, get the least amount of shift.

Also disclosed is a method for squeezing an input hue, $H_{in}$, toward a region of preferred hue, $H_{pref}$, having a preferred chroma, $C_{pref}$ and luminance, $L_{pref}$, to restrict the rotation effect to a point in LCH space rather than an entire hue slice. This method involving first defining a chroma weight as: $C_{weight} = \text{Gaussian}(C_{pref}, C_{sigma})$. Then, defining a luminance weight as: $L_{weight} = \text{Gaussian}(L_{pref}, L_{sigma})$. Defining a hue weight that approaches 1 at the peak of a Gaussian as: $H_{weight} = \text{Gaussian}(H_{pref}, H_{sigma})$. Defining an amount of hue adjustment as: $H_{adjust} = \Delta H * (H_{weight} * C_{weight} * L_{weight})$. Then, generating an output hue by applying hue adjustment to hue input such that: $H_{out} = H_{in} - H_{Adjust}$.

To restrict the rotation effect to be toward a point in LCH space, rather than toward an entire hue slice:

$C_{weight} = \text{Gaussian}(C_{pref}, C_{sigma})$ $L_{weight} = \text{Gaussian}(L_{pref}, L_{sigma})$ $H_{weight} = \text{Gaussian}(H_{pref}, H_{sigma})$ $$H_{adjust} = \Delta H^* (H_{weight} * C_{weight} * L_{weight})$$

$$H_{out} = H_{input} - H_{adjust}$$

Alternately, the weighting function was altered to be a Gaussian was convolved with a Rect function, which allows independent control over how much to adjust colors and how far away from $H_{pref}$ to change the colors.

Preferably, the weighting function is replaced by the addition of two Gaussians, which allows additional flexibility over how colors are moved toward the preferred point by allowing additional parameters (K, M) for the adjustment.

$$weight\_tmp = e^{\frac{-(H\_in-M)^2}{2*H\_sigma^2}} + e^{\frac{-(H\_in+M)^2}{2*H\_sigma^2}}$$

$$H_{weight} = K^* weight\_tmp/\max(weight\_tmp)$$

The constant K in the second equation is adjusted such that no crossovers occur in hue. This parameter is adjusted such that the relationship between $H_{out}$ and $H_{in}$ is monotonically increasing.

Also disclosed is a method for determining an adjustment amount to be made to an input chroma, $C_{in}$, to squeeze the input chroma toward a region of preferred chroma, $C_{pref}$. This method involving first defining a change in chroma as: $\Delta C = C_{in} - C_{pref}$ and defining a chroma weight as: $C_{weight} = Gaussian(C_{pref}, C_{sigma})$. Then, an amount of chroma adjustment is then: $C_{Adjust} = \Delta C^* (H_{weight} * C_{weight} * L_{weight})$. An output chroma is generated by applying chroma adjustment to chroma input:

$$C_{out} = C_{in} - C_{Adjust}.$$

The change in chroma, $\Delta C$, is the difference between the chroma of interest, $C_{in}$ and the preferred chroma, $C_{pref}$.

$$\Delta C = C_{in} - C_{pref}$$

$$C_{weight} = Gaussian(C_{pref}, C_{sigma})$$

$$L_{weight} = Gaussian(L_{pref}, L_{sigma})$$

$$H_{weight} = Gaussian(H_{pref}, H_{sigma})$$

$$C_{Adjust} = \Delta C^* (H_{weight} C_{weight} * L_{weight})$$

$$C_{out} = C_{in} - C_{Adjust}$$

Although the current description is directed toward three one-dimensional Gaussian functions, it is intended to also be directed toward a single three-dimensional Gaussian.

The present method is also extensible to squeezing colors toward a point in RGB space, a*b* (as opposed to h°/C*) space, u'v' space, etc.

Because of the sequential nature of the present method, colors are squeezed toward a point and not shifted directly to that point. Colors near the preferred point don't change much as the hue adjustment approaches 0, and this prevents hues from crossing the preferred point or hue reversals.

The present invention is additionally applicable for multiple hue centers, for example, to squeeze toward preferred skin, sky, and grass. This is done sequentially, but as each subsequent squeeze occurs, the former preferred points also be inadvertently shifted. Therefore, in the case of multiple squeezes, finite non-overlapping regions of support are defined making certain to produce smooth transitions between these regions. The squeezing is alternately applied in a non-uniform way, for example, to account for a rapid decrease in quality for positive $\Delta H^*_{ab}$ (yellow) renditions of skin tones. This only involves using the left side of one weighting curve and the right side of another; this is accomplished using two different values of $H_{sigma}$.

The present method can be applied in a device or in an abstract profile. The preferred colors can be pre-specified in the color management system or dynamically specified by the user.

Further advantages include no need for segmentation or other knowledge of input image; no need to specify original color or color vector; monotonicity (no crossovers), smoothness, and flexibility (e.g., the size of the region of surrounding colors this is affected by the "squeezing" can be varied).

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for squeezing chroma values ($C_{in}$) of a digital image toward a preferred chroma value ($C_{pref}$) for the digital image, comprising:
   (a) receiving a digital image file, the digital image file including a plurality of pixels of color image data, each pixel of the color image data being defined by a hue value, a chroma value, and a lightness value;
   (b) selecting a chroma value ($C_{in}$) from the digital image file;
   (c) selecting a preferred chroma value ($C_{pref}$);
   (d) calculating a chroma change value ($\Delta C = C_{in} - C_{pref}$);
   (e) calculating a chroma weight value ($C_{WEIGHT}$), a hue weight value ($H_{weight}$), and a lightness weight value ($L_{weight}$);
   (f) calculating chroma adjustment value ($C_{Adjust} = \Delta C^* (H_{weight} * C_{weight} * L_{weight})$);
   (g) calculating a destination chroma value, ($C_{out} = C_{in} - C_{Adjust}$);
   (h) repeating, for each chroma value in the digital image file, the selecting of the chroma value from the digital image file, the calculating of the chroma change value, the calculating of the chroma adjustment value, and the calculating of the destination chroma value; and
   (i) generating a modified digital image file by replacing each chroma value in the digital image file with the associated calculated destination chroma value.

2. The method, as claimed in claim 1, wherein the chroma weight value ($C_{WEIGHT}$) equals Gaussian($C_{pref}, C_{sigma}$).

3. The method, as claimed in claim 1, wherein the lightness weight value ($L_{WEIGHT}$) equals Gaussian($L_{pref}, L_{sigma}$).

4. The method, as claimed in claim 1, wherein the hue weight value ($H_{WEIGHT}$) equals Gaussian($H_{pref}, H_{sigma}$).

5. The A method, as claimed in claim 1, wherein the preferred chroma value ($C_{pref}$), the chroma weight value ($C_{WEIGHT}$), the hue weight value ($H_{weight}$), and the lightness weight value ($L_{weight}$) are pre-specified in a color management system.

6. The method, as claimed in claim 1, wherein the preferred chroma value ($C_{pref}$), the chroma weight value ($C_{WEIGHT}$), the hue weight value ($H_{weight}$), and the lightness weight value ($L_{weight}$) are dynamically specified by a user.

7. The method, as claimed in claimed 2, wherein a first chroma weight value ($C1_{WEIGHT}$), a first hue weight value ($H1_{weight}$), and a first lightness weight value ($L1_{weight}$) is calculated for chroma values less than the preferred chroma value and a second chroma weight value ($C2_{WEIGHT}$), a second hue weight value ($H2_{weight}$), and a second lightness weight value ($L2_{weight}$) is calculated for chroma values greater than the preferred chroma.

8. A method for squeezing hue values ($H_{in}$) of a digital image toward a preferred hue value ($H_{pref}$) for the digital image, comprising:
   (a) receiving a digital image file, the digital image file including a plurality of pixels of color image data, each pixel of the color image data being defined by a hue value, a chroma value, and a lightness value;
   (b) selecting a hue value ($H_{in}$) from the digital image file;
   (c) selecting a preferred hue value ($H_{pref}$);
   (d) calculating a hue change value ($\Delta H = H_{in} - H_{pref}$);
   (e) calculating a chroma weight value ($C_{WEIGHT}$), a hue weight value ($H_{weight}$), and a lightness weight value ($L_{weight}$);
   (f) calculating a hue adjustment value ($H_{Adjust} = \Delta H * (H_{weight} * C_{weight} * L_{weight})$);
   (g) calculating a destination hue value ($H_{out} = H_{in} - H_{Adjust}$);
   (h) repeating, for each hue value in the digital image file, the selecting of the hue value from the digital image file, the calculating of the hue change value, the calculating of the hue adjustment value, and the calculating of the destination hue value; and
   (i) generating a modified digital image file by replacing each hue value in the digital image file with the associated calculated destination hue value.

9. The method, as claimed in claim 8, wherein the chroma weight value ($C_{WEIGHT}$) equals Gaussian($C_{pref}, C_{sigma}$).

10. The method, as claimed in claim 8, wherein the lightness weight value ($L_{WEIGHT}$) equals Gaussian($L_{pref}, L_{sigma}$).

11. The method, as claimed in claim 8, wherein the hue weight value ($H_{WEIGHT}$) equals Gaussian($H_{pref}, H_{sigma}$).

12. The method, as claimed in claim 8, wherein the preferred hue value ($H_{pref}$), the chroma weight value ($C_{WEIGHT}$), the hue weight value ($H_{weight}$), and the lightness weight value ($L_{weight}$) are pre-specified in a color management system.

13. The method, as claimed in claim 8, wherein the preferred hue value ($H_{pref}$), the chroma weight value ($C_{WEIGHT}$), the hue weight value ($H_{weight}$), and the lightness weight value ($L_{weight}$) are dynamically specified by a user.

14. The method, as claimed in claim 8, wherein a first chroma weight value ($C1_{WEIGHT}$), a first hue weight value ($H1_{weight}$), and a first lightness weight value ($L1_{weight}$) is calculated for hue values less than the preferred hue value and a second chroma weight value ($C2_{WEIGHT}$), a second hue weight value ($H2_{weight}$), and a second lightness weight value ($L2_{weight}$) is calculated for hue values greater than the preferred hue value.

15. A method for squeezing first colorspace values ($CS1_{in}$) of a digital image toward a first colorspace preferred value ($CS1_{pref}$) for the digital image, comprising:
   (a) receiving a digital image file, the digital image file including a plurality of pixels of color image data, each pixel of the color image data being defined by a colorspace, the colorspace having a first colorspace value (CD1), a second colorspace value (CS2), and a third colorspace value (CS3);
   (b) selecting a first colorspace value ($CS1_{in}$) from the digital image file;
   (c) selecting a first preferred colorspace value ($CS1_{pref}$);
   (d) calculating a first colorspace change value ($\Delta CS1 = CS1_{in} = CS1_{pref}$);
   (e) calculating a first colorspace weight value ($CS1_{WEIGHT}$), a second colorspace weight value ($CS2_{weight}$), and a third colorspace weight value ($CS3_{weight}$);
   (f) calculating a first colorspace adjustment value ($CS1_{Adjust} = \Delta CS1 * (CS1_{weight} * CS2_{weight} * CS3_{weight})$);
   (g) calculating a first colorspace destination value ($CS1_{out} = CS1_{in} - CS1_{Adjust}$);
   (h) repeating, for each first colorspace value in the digital image file, the selecting of the first colorspace value from the digital image file, the calculating of the first colorspace change value, the calculating of the first colorspace adjustment value, and calculating of the first colorspace destination value; and
   (i) generating a modified digital image file by replacing each first colorspace value in the digital image file with the associated calculated first colospace destination value.

16. The method, as claimed in claim 15, wherein the first colorspace weight value ($CS1_{WEIGHT}$) equals Gaussian ($CS1_{pref}, CS1_{sigma}$).

17. The method, as claimed in claim 15, wherein the preferred first colorspace value ($CS1_{pref}$), the first colorpace weight value ($CS1_{WEIGHT}$), the second colorspace weight value ($CS2_{weight}$), and the third colorspace weight value ($CS3_{weight}$) are pre-specified in a color management system.

18. The method, as claimed in claim 8, wherein the preferred first colorspace value ($CS1_{pref}$), the first colorspace weight value ($CS1_{WEIGHT}$), the second colorspace weight value ($CS2_{weight}$), and the third colorspace weight value ($CS3_{weight}$) are dynamically specified by a user.

19. The method, as claimed in claim 8, wherein a first colorspace weight value ($CS1_{WEIGHT}$), a second colorspace weight value ($CS2_{weight}$), and a third colorspace weight value ($CS3_{weight}$) is calculated for first colorspace values less than the preferred first colorspace value and a fourth colorspace weight value ($CS4_{WEIGHT}$), a fifth colorspace weight value ($CS5_{weight}$), and a sixth colorspace weight value ($CS6_{weight}$) is calculated for first colorspace greater than the preferred first colorspace value.

* * * * *